UNITED STATES PATENT OFFICE.

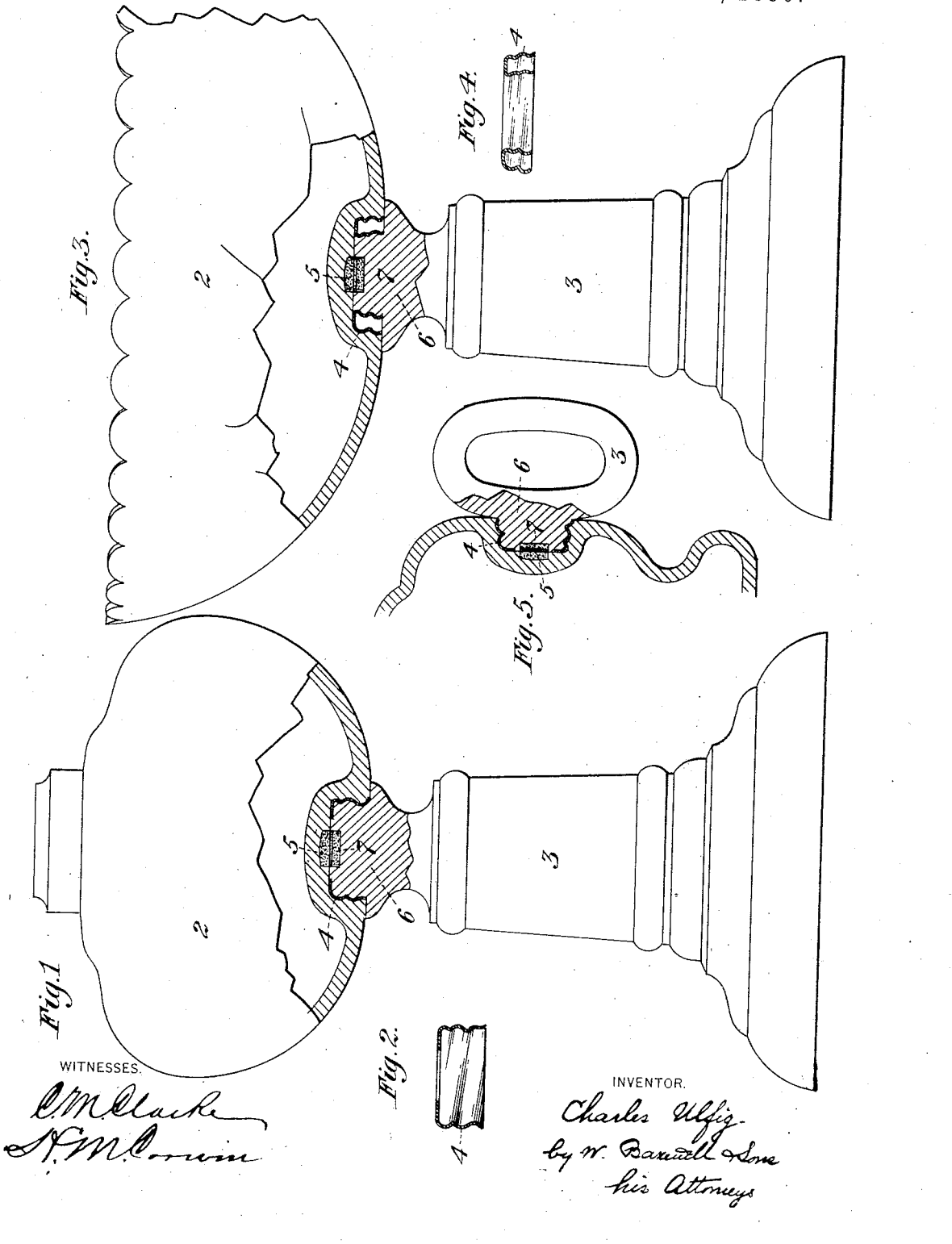

CHARLES ULFIG, OF MARTIN'S FERRY, OHIO.

MANUFACTURE OF GLASSWARE.

SPECIFICATION forming part of Letters Patent No. 439,447, dated October 28, 1890.

Application filed July 17, 1890. Serial No. 359,036. (No model.)

*To all whom it may concern:*

Be it known that I, CHARLES ULFIG, of Martin's Ferry, in the county of Belmont and State of Ohio, have invented a new and useful Improvement in Means for Connecting Parts of Glassware, of which the following is a full, clear, and exact description.

The object of my invention is to provide means for attaching handles, stems, feet, &c., to glassware. Heretofore the most common manner of attaching such parts to glassware—such as lamps, bowls, vases, &c.—has been first to make the foot, stem, &c., and set it while hot in an apparatus called a "jigger," on which rests the mold in which the article is to blown, and then when the article is blown its hot and then comes into contact with the end of the foot or stem and is welded thereto. Another common mode is to form the article and the stem or foot separately and to unite them by an interposed bit of hot and plastic glass. The disadvantages of such methods consist in the expensive nature of the apparatus required and in the great loss arising from breakage, and if either part breaks the other cannot be used. Such breakage may occur in the process of manufacture, or if one of the parts be insufficiently hot the other will not weld to it firmly, and when passing through the annealing lear they are apt to fly or crack. Under any circumstances it is very difficult to secure a firm union when the article and its stem or foot are made of glass of different compositions—for example, if one be of crystal glass and the other of opal glass. Other methods of uniting such parts have been invented. Glass articles have been blown or pressed with a threaded portion adapted to receive a threaded part of a stem or foot, and metallic pegs have been embedded in the glass for a like purpose. The first of these methods is expensive and, by reason of the insecurity of the union and its liability to break, is unsafe, especially when applied to the manufacture of lamps. The second method is unreliable, because during the manufacture the metallic peg expands and on cooling shrinks more than the glass, and therefore becomes loose and unsteady. All these difficulties and others familiar to the skilled glass-manufacturer are overcome by the means of my invention, in using which I form the glass article and its foot or stem in separate parts and insert in a suitable receptacle in the mold in which the article is blown or pressed a metallic tapering ferrule having double or single walls, formed with threads both on the exterior and interior. The ferrule is thus embedded in a socket in the glass, and at the operation of blowing or pressing a depression is preferably formed in the glass at the base of the socket. The stem or foot is formed with an externally-threaded end adapted to be screwed into the ferrule, and also, preferably, with a depression adapted to register with the depression in the glass above mentioned. The threaded end of the stem or foot is then screwed into the ferrule in the glass, and, as the ferrule is tapering in form, the farther the parts are screwed together the more tightly is the ferrule expanded in the socket. The parts are prevented from unscrewing by cement placed preferably in the registering depressions above mentioned.

I shall now describe my invention more particularly with reference to the accompanying drawings, in which—

Figure 1 is a side elevation, partly in vertical section, of a lamp having a foot secured in place according to my invention. Fig. 2 is a vertical sectional view of the ferrule. Fig. 3 is a vertical section of a glass bowl, showing a modified form of my improved connection between the bowl and foot. Fig. 4 is a sectional view of the ferrule shown in Fig. 3. Fig. 5 is a sectional view showing the application of my invention to uniting a handle to a glass article, such as a lamp.

Like symbols of reference indicate like parts in each view.

In the drawings, Fig. 1, 2 is a lamp-bowl, and 3 is the foot.

In forming the lamp-bowl in the mold I place at the bottom of the mold a sheet-metal ferrule 4, screw-threaded both externally and internally, as shown in Fig. 2, and form the glass on and around this ferrule, which thus constitutes a metal-lined socket at the base of the lamp, as shown in Fig. 1, and at the base of the socket in the lamp-bowl I preferably form a groove or depression 5 in the glass. The end of the foot is formed with a screw-threaded portion 6 and preferably with a depression 7 at its extreme end. The bowl, having been formed with a ferrule at the base, is screwed to the end of the foot, and, as the ferrule is preferably tapering in shape, the foot jams itself tightly therein and tends to force the ferrule out laterally within its socket. The parts are permanently held together by cement, which should be placed in the depression 5 or 7 before screwing the parts together. Broadly considered, however, my invention is not limited to the use of this cement, as other retaining appliances may be employed in connection with the ferrule. The ferrule may be also used without the cement or any other fastening device, in which case the parts are merely screwed together, and the ferrule acts as an elastic bushing to prevent the contact of glass with glass.

In Fig. 3 I show the application of my invention to securing the foot of a bowl, and in this figure I illustrate a ferrule of modified construction, which is represented in detail in Fig. 4. This ferrule is made with double walls having an intervening annular space, which renders the inner wall within which the glass fits more elastic. This double-walled ferrule may be made of a single piece of metal or two pieces secured together, as will be readily understood.

In Fig. 5 I show the application of my invention to securing a handle to the bowl of a lamp. The handle is the equivalent of the foot 3 shown in Fig. 1, and by reference to the description of the last-mentioned figure the mode of application of the handle will be readily understood. In like manner my invention is applicable to securing together parts of vases and other articles of glassware or to securing together articles made partly of glass and partly of metal—for example, glass chandeliers, vases with metal handles, &c.

The advantages of my improved fastening device will be appreciated by those skilled in the art.

My invention is economical in respect of saving of labor and cost of apparatus. It reduces to a minimum the breakage of the glass, makes it possible to unite glass of different compositions, and to decorate the glass parts in encaustic colors such as may be desirable.

Heretofore it has not been practicable to decorate glassware formed of welded parts, since it would fly in the process of burning in the kiln.

I claim—

1. As means for attaching parts of glassware, an annular metallic ferrule threaded externally and internally and contained in a socket in the glass which forms one of the parts to be united and an externally-threaded projection which is formed on the other of said parts and is screwed into the interior of said annular ferrule, substantially as and for the purposes described.

2. As means for attaching parts of glassware, a metallic ferrule consisting of two concentric connected rings threaded externally and internally and contained in a socket in the glass which forms one of the parts to be united and an externally-threaded projection which is formed on the other of said parts and is screwed into the interior of the inner one of said rings, substantially as and for the purposes described.

In testimony whereof I have hereunto set my hand this 12th day of July, A. D. 1890.

CHARLES ULFIG.

Witnesses:
  GUST. PROEHLER,
  J. G. WETZEL.